Patented July 21, 1931

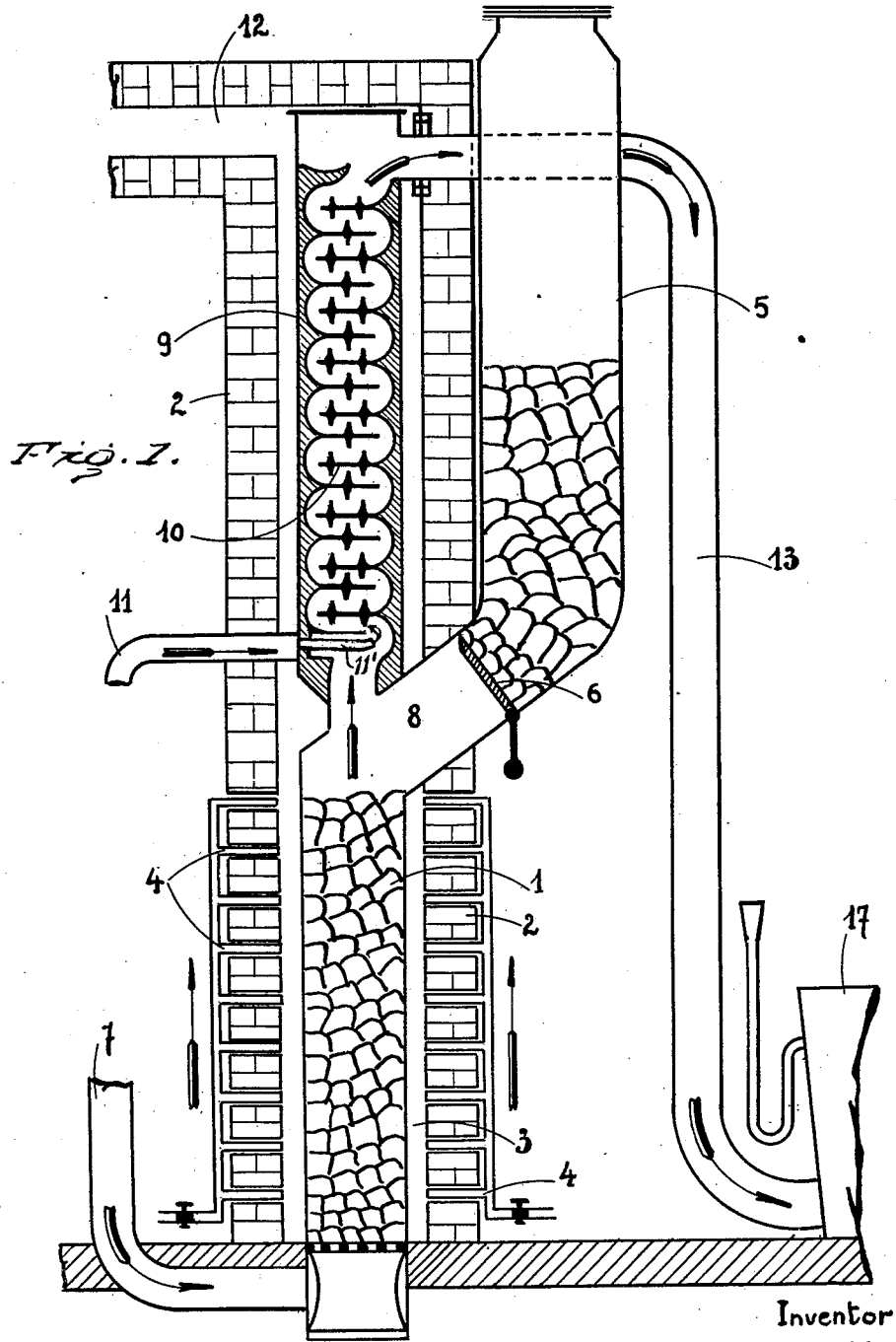

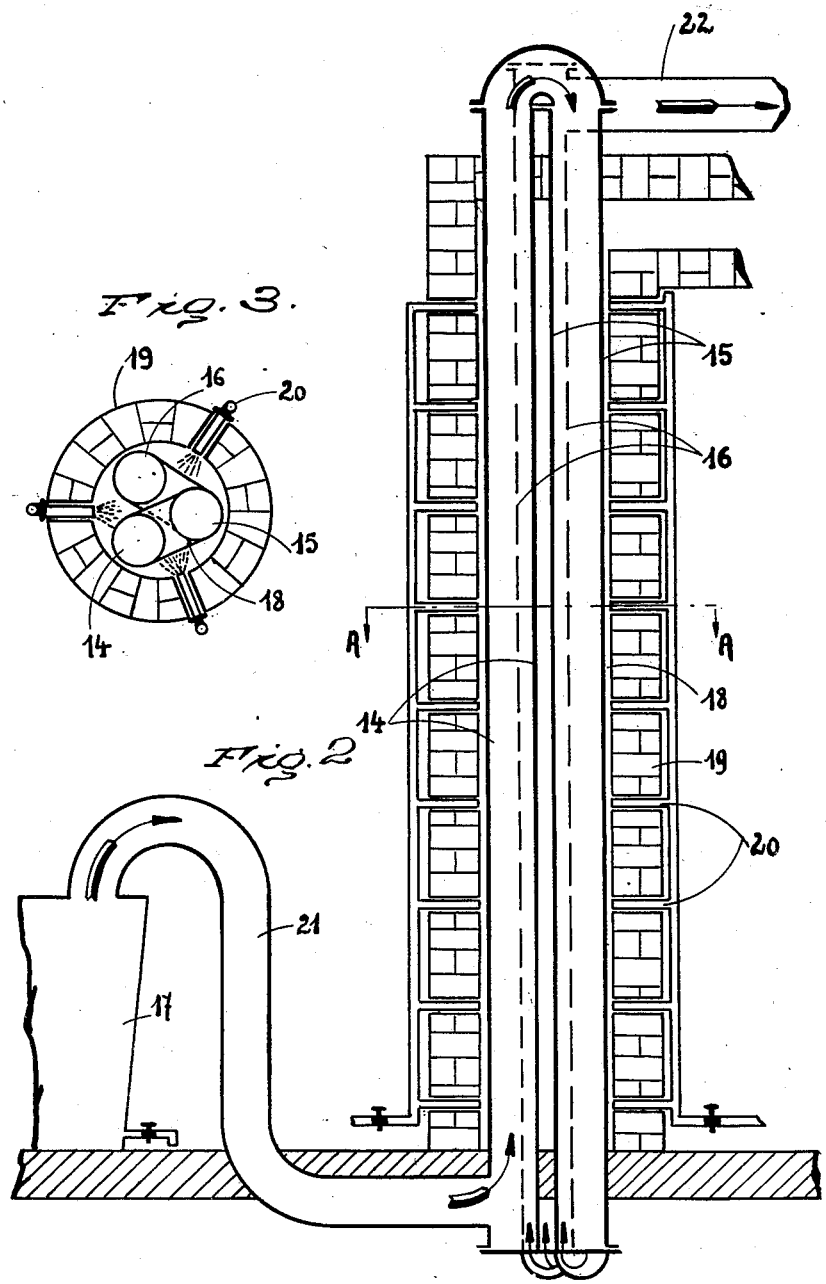

1,815,090

UNITED STATES PATENT OFFICE

JULIEN BELLAY, OF BRUSSELS, BELGIUM

DEVICE FOR CONTINUOUSLY PRODUCING PURE HYDROGEN

Application filed January 13, 1928, Serial No. 246,558; and in Belgium January 26, 1927.

My present invention has for its object to provide an improved process of and devices for producing pure hydrogen by means of watergas, the latter being produced by the gasification of coke, lignite, turf and other fuel rich in carbon, without admission of outer air, within a generator heated from outside and into which superheated steam will be blown according to the formula $C+H_2O=CO+2H$, the reaction taking place as soon as the generator is heated to white heat. Then the gas produced will be enriched in hydrogen by causing the same to flow through a column forming an extension of the lower generator with adjustable heating and having partitions made of fireproof clay and coal. Such enrichment will be caused according to the formula: $CO + H_2O=CO_2+H_2$ by blowing into said column steam superheated to a temperature of 100 to 400°. Then the gas thus enriched will be brought into a known purifier and condenser, containing lime milk and in which the carbon dioxide and coal dust as well as other impurities will be separated, the remaining gases being brought into a purifier formed of a number of pipes heated from outside and interconnected to form a coil, said purifier being filled with a fresh preparation of soda-lime, hereinafter fully described and completely retaining all the CO and $CO_2$ still remaining in the hydrogen, the pure hydrogen discharged from said purifier being passed into a gasholder.

The oxidation of watergas will be effected in a column the interior of which is filled with layers of clay forming rough, fireproof and undulated surfaces. Engaged in said layers of clay are pieces of granulated charcoal in such a way that the lower layers of clay exposed to the highest temperatures contain the lowest percentage of charcoal, whilst the upper layers in which the temperature will progressively decrease, contain a progressively higher percentage of charcoal, with the result that the watergas produced in the generator and flowing through the column, and steam blown into the column, will be thoroughly mixed owing to the baffles formed by the layers of clays and that by the influence of the pressure, temperature, speed and quantity of steam blown into the column, the chemical reaction between the gases and steam in presence of charcoal will take place in the most favorable conditions. The heat required for heating the column will be furnished by the gases heating the generator.

The new process and device will be more fully described hereinafter with reference to the accompanying drawings showing diagrammatically the complete plant.

Figure 1 is a vertical sectional view of the generator and enriching column and part of the first purifier.

Figure 2 is a similar and prolonging view to Figure 1, showing the other part of the first purifier and the second purifier.

Figure 3 is a section along line A—A of Figure 2, seen as the arrows.

The device comprises a central retort or generator 1 surrounded by a fireproof shell 2 forming an annular heating chamber 3 around the retort. The generator is heated on its entire height by burners 4 arranged in step like arrangement and fuel (coke, lignite, turf, charcoal and the like) will be supplied to the same by an upper hopper 5 provided with a slide valve 6.

The water will be supplied in the state of superheated steam through a lower conduit 7, the temperature of steam being sufficient for preventing the highly heated fuel from being cooled. The admission of cold air is carefully avoided and the device will be sufficiently heated for producing at 8 watergas which permits of practically recovering 70% of hydrogen.

The temperature of the fuel is not subject to any change, because the fuel will always be heated from outside by the same number of burners and the amount of superheated steam will likewise remain the same, so that the amount and composition of the watergas produced will always be identical.

The retort or generator 1 is extended upwardly by a column 9 within which the watergas discharged from the generator will be enriched in hydrogen.

In order to suck the watergas into the column 9 I may provide a Venturi blow nozzle II' terminating the conduit 11 for superheated steam blown into the column, wherein the enrichment of the watergas in hydrogen will be maximum.

The heat required for heating the mass will be furnished by the hot gases of the lower generator 1.

The combustion gases will escape through 12 and serve for instance to superheat the steam. Obviously the heating of the column and retort may be effected by any other means, provided that the same will be made from outside. The gas discharged from the column 9 will be brought through a conduit 13 through a condensing purifier 17 of any known type containing lime milk (waste from the regeneration) for the separation of carbon dioxide and coal dust, then into a particular purifier in which the hydrogen will be purified from any carbon oxide and other gases. Said purifier comprises vertical pipes 14—15—16 connected to each other and arranged within a chamber 18 (section A—A) surrounded by fireproof material 19.

The chamber 18 is heated to an experimentally determined temperature by a series of stepped burners 20. The gas discharged from the purifier 17 will pass through a conduit 21 into the first tube 14, flows upwardly and then downwardly through the tubes 15, then upwardly again through the tubes 16, whereby the gas will be caused to follow a long path before passing into a gasholder (not shown). The arrows indicate the path of the gas. Such tubes are filled with a special preparation of lime and soda which will separate the little quantities of carbon monoxide and other impurities which still remain in the hydrogen. Such preparation of lime and soda is fully described and claimed in a co-pending application filed by me.

By definition the soda-lime is a mixture of lime and soda obtained by pouring a solution of soda upon quick lime and calcining the mixture in a crucible. The slaking of lime made for my process does not correspond to the theory, but provides a supplemental amount of soda solution in order to give the mass the required binding and permit the same to remain shaped after low calcination.

This operation will be effected in retorts 14 to 16 during the period of regeneration of soda-lime.

Such quick soda-lime will then be slaked by a solution of 5% of soda at 95° C. in a proportion of 800 grams per kilogram of soda-lime, whereby flower of soda-lime will be obtained. Such flower of soda-lime will be brought into a conical separator, closed and provided with a ventilation, so as to remove any particles not slaked which could obstruct the passage of gas in the retorts during the operation. Then it will be discharged into molds provided with partitions forming rectangular volumes of about 50 x 100 x 30 millimeters. Said partitions rest on a movable bottom forming an ejector. Said molds are arranged on an endless belt and submit the soda-lime powder to the sprinkling of a solution of soda-lime milk or soda solution at 50° C. Such sprinkling will be effected progressively so as to not form a liquid paste in the molds and cause the solution to slowly impregnate into the soda-lime in a hot and powdered state, a second sprinkling being effected only after the first one has filtered through the powder of soda-lime. The number of sprinklings is calculated in such a way that at the end of the endless belt the molds will contain a sort of bricks of hydrated soda-lime which may be easily removed and placed upon wooden hurdles in order to obtain a solid shape after a few hours.

The same result may also be obtained by a mixing operation but the method above described has the advantage to not compress nor triturate the soda-lime and obtain a fine brick containing 1250 grams of the hot solution for 2 kilograms of soda-lime powder. Said solution has slowly impregnated the powder and solidified the same, at the same time giving same such high porosity and moistness that it will be particularly convenient for absorbing quickly the CO contained in the water gas. The bricks of about 50 x 100 x 30 millimeters placed upon hurdles will be quickly dried by the action of the heat contained in the paste and having the great advantage with relation to any smaller product that they have but a few faces to be dried and, therefore, keep the moistness as long as possible.

The hydrated soda-lime bricks after a few hours have a solid, porous shape adapted to be handled. The faces thereof are brilliant and carbonated and thus avoid coagulation of the material in the retort. Said bricks will be manufactured in sizes suitable for the retorts intended to receive the same. The larger the retort, the longer the bricks but of the same thickness.

For the purpose of purifying the retorts prior to the use thereof, a solution of soda or potash will be slightly vaporized on the brick of lime and soda to remove any $CO_2$ and O contained in the retort and carbonate the faces of the latter.

The mass introduced into the columns 14, 15, 16 may be prepared according to any other process, as that described in my copending application referred to, provided that the same contains lime and soda or potash.

Thus I may use quick lime with a solution of soda or potash, or soda with a solution of quick lime or soda-lime.

The gas discharged from the soda-lime purifier 14—15—16 is practically pure and will be received in a gasholder.

The large plants have two ovens or furnaces with soda-lime purifiers, one of which is in use whilst the other will be emptied and the contents thereof regenerated.

Obviously for the heating I may use any kind of burners or any other means, provided that the generator, column and tubes will be heated on their entire height.

The process and device have the following main advantages:

(1) Owing to the production of gas rich in hydrogen at the entrance of the coiled purifier, a small amount of soda-lime will be used.

(2) The purification is very simple and complete.

(3) The operation is continuous.

(4) The tubes are purified before the use thereof.

(5) The handwork is very reduced.

Having now fully described my said invention, what I claim and desire to secure by Letters Patent, is:

1. A device for continuously producing pure hydrogen by means of watergas, comprising in combination a cylindrical generator, means for adjustably heating the same from outside, means for injecting superheated steam into the lower part of same, a column containing layers of fireproof clay mixed with charcoal and forming an extension of said generator, means for injecting superheated steam into said column, a condensation purifier connected to said column, a tubular system connected to said purifier and means for adjustably heating the same from outside.

2. A device for continuously producing pure hydrogen by means of watergas, comprising in combination a cylindrical generator, means for adjustably heating the same from outside, means for injecting superheated steam into the lower part of same, a column containing layers of fireproof clay mixed with charcoal and forming an extension of said generator, projections formed on said layers of clay and constituting baffles recurring a thorough mixture of the gases, means for injecting superheated steam into said column, a condensation purifier connected to said column, a tubular system connected to said purifier and means for adjustably heating the same from outside.

In testimony whereof I have hereunto set my hand.

JULIEN BELLAY.